Patented May 31, 1938

2,119,125

UNITED STATES PATENT OFFICE 2,119,125

FUNGICIDES AND INSECTICIDES

Myron Vernon Anthony, New Haven, Conn., assignor to Stauffer Chemical Company, New York, N. Y., a corporation of New York No Drawing. Application March 23, 1935, Serial No. 12,741

6 Claims. (Cl. 167—20)

This invention relates to fungicides and insecticides, and more particularly to the production of stable compositions utilizable in the production of fungicides and insecticides, as well as methods of producing the same.

Among the objects of the present invention is the production of compositions which are miscible with water to produce stable solutions, emulsions or dispersions for utilization as fungicides and insecticides.

Other objects include compositions which may be added to prior art insecticides and fungicides for stepping up the action of such prior art materials.

Still further objects include the production of fungicides and insecticides with sulphur components, and particularly sulphur components of entirely novel types and functions.

And still further objects include novel extracts of fungicidal or insecticidal plant origin.

Still further objects and advantages will appear from the more detailed description set forth below, it being understood, however, that this more detailed description is given by way of illustration and explanation only, and not by way of limitation, since various changes may be made therein by those skilled in the art without departing from the scope and spirit of the present invention.

In accordance with this invention, sulphur components are particularly utilized in the production of insecticidal and fungicidal compositions of novel characteristics. The sulphur component utilized, is employed in the presence of a miscibilizing agent in proportions so that such composition may be utilized in aqueous media to produce substantial miscibility. Such sulphur component with the miscibilizing agent may have added to it various fungicidal and insecticidal components for particular utilization. The composition containing the sulphur component and miscibilizing agent, may be utilized as such in the production of fungicidal and insecticidal compositions, or may be employed as an addition to other types of insecticidal and fungicidal compositions, because in the latter event, it has been found as illustrated below, that a stepping up action is thus obtained that very materially increases the potency of such insecticides and fungicides, and gives to them attributes and properties which they did not possess prior to the inclusion of the added material. The invention will be illustrated by a number of examples and utilizations thereof.

Thus a sulphur solvent, like carbon disulphide is employed together with a miscibilizing agent, such as sulphonated castor oil (Turkey red oil), the proportions of ingredients being such that there is sufficient miscibilizing agent present to give the composition ready miscibility with water in the production of the final sprays, emulsions or dispersions to be utilized for insecticidal or fungicidal purposes. Specific examples of varying proportions of the ingredients that may be employed are given below. The amount of miscibilizing agent may vary considerably, but as noted, there should be sufficient so that the final composition has ready miscibility with water. The amount of miscibilizing agent may also depend to some extent on the nature of added components that are utilized with the composition.

This composition containing the sulphur solvent and the miscibilizing agent, may be utilized with sulphur or sulphides. The sulphur or sulphides may be carried in either of the components of the composition, but particularly in the carbon disulphide. Elementary sulphur may be utilized for this purpose, or various sulphides and polysulphides may be utilized, such as hydrogen sulphide, sodium sulphide, potassium sulphide, copper sulphide, selenium sulphide, calcium sulphide, ammonium sulphide, and the polysulphides of the stated metals. The compositions containing carbon disulphide, miscibilizing agent like sulphonated castor oil, and sulphur or sulphides particularly utilizable for fungicidal purposes, either with or without the addition of other components, is more particularly set forth below.

The inclusion of sulphur or sulphides is not essential in such compositions, except for particular utilizations, and carbon disulphide and miscibilizing agent compositions, may be employed without the addition of sulphur or sulphides thereto, by utilizing other insecticidal or fungicidal components therewith, or the composition containing the carbon disulphide and sulphonated castor oil, for example, may be employed as an addition to prior art types of insecticides and fungicides to obtain an increase in activity of the latter, which is of remarkable character.

If desired, the sulphides themselves may be dissolved in the Turkey red oil or similar miscibilizing agent, and the composition utilized without necessarily employing any sulphur solvent in the composition, such as the carbon disulphide.

In the production of these miscible solutions, the use of sulphonated castor oil or Turkey red oil has proved particularly desirable, but other types of miscibilizing agents may be employed, among which may be noted the various sulphonated organic compounds, particularly hydrocarbons such as naphthalene, sulphonated organic or glyceride oils and sulphonated mineral oils, sulphated alcohols, such as sodium, potassium, copper, etc., oleyl or stearyl, or lauryl, etc., sulphates; sulphated or sulphonated phenols, such as the products "Aresco", "Aresket" and "Areskap"; and sulphonated naphthalene derivatives such as "Nekals" and "Alkanols", sulphonated fatty acid ester derivatives exemplified by "Emulphor EL" and "Emulphor A oil soluble" or "Igepon A", the fatty acid ester of sulphonated aliphatic compounds, or "Igepon T", the fatty acid ester of sulphonated amido compound.

While carbon disulphide has been particularly emphasized above for utilization in connection with the present invention, other materials and solvents may be employed for particular purposes, including the petroleum and coal tar naphthas, hydrogenated naphthalene, chlorinated naphthalene, benzine, hexalin, trichloro-ethylene, carbon tetrachloride, etc.

The inclusion of various insecticidal and fungicidal components is particularly desirable, because by the utilization of the present invention with such added insecticidal or fungicidal components, miscible solutions are thereby obtained. Among such insecticidal and fungicidal components may be mentioned the various plants and plant extracts, such as pyrethrum, nicotine, derris, cube, devils shoe string, hellebore, gamboge, larkspur, and their various products and derivatives, pyrethrins, rotenone, dihydrorotenone, deguelin, dihydrodeguelin, and other hydrogenated plant extracts, furfural, pyridin, thiocyanates, and heavy metal salts, such as copper sulphate, copper silicate, copper oxychloride, etc.

The composition is also of such character that it readily lends itself to the inclusion of various added components. Thus resinates, such as those of sodium, potassium and copper may be included, such resinates, particularly copper resinate, adding to the toxicity of the carbon disulphide. Fire-proofing salts or materials may be included, such as ammonium phosphate, which included in the composition has the fire-proofing effect on the liquid phase of the composition. The thioureas and particularly diphenylthiourea may be employed for addition to such composition. Copper derivatives, such as cupric ammonium sulphate or carbonate may be utilized. Stomach poisons may be added to the composition, as exemplified, for example, by the arsenicals. Oils, mineral, organic or glyceride, including rubber oil, pine oil, camphor oil, etc. may be included in the composition. Mercury derivatives, such as ethyl mercury salts or mercury phenylates may be added. Soaps and other spreading agents may, of course, be included in the composition. Cresylic acid, benzaldehyde and other types of ingredients may be employed. Some of these materials have special properties in these compositions. For example, benzaldehyde while itself having some insecticidal activity in some way modifies the break down of the composition containing, for example, such components as ammonium oleate and carbon disulphide in the presence of alcohol, preventing the formation of hydrogen sulphide in such composition.

It has been pointed out above that the carbon disulphide component of the composition may desirably be utilized as the solvent for the fungicidal or insecticidal component of the composition. As noted, the carbon disulphide is particularly desirable as a solvent for the sulphur or sulphides, when the latter are employed in the composition. The carbon disulphide may also desirably be utilized as an extractive agent for extracting insecticidal materials from plant products, and the resulting carbon disulphide extract of the active principle of the plant may thereby be utilized in the production of compositions in accordance with the present invention, such carbon disulphide extracts being mixed with the miscibilizing agent to produce the stock material employed in accordance with the present invention with or without the addition of other components herein. Thus a carbon disulphide extract of derris containing active rotenone may desirably be employed. This enables the plant extract of active insecticidal material to be produced directly in a vehicle that may be employed directly in the production of insecticidal and fungicidal compositions. It may also be noted that not all extracting materials have the same action on the plant material, and the carbon disulphide has been found to be particularly effective in reaching the desirable components of the plant material, such as derris, which it is desired to extract therefrom.

It has further been found that there is a marked difference in activity of the various forms of sulphur when employed in these compositions. Ordinarily forms of crystalline types of sulphur on the market are thus found not to be as effective as the amorphous sulphur, or the sulphurs insoluble in carbon disulphide. Not only does the amorphous sulphur appear to exhibit a greater toxicity in these compositions, but its compatibility with oils makes it particularly desirable for utilization in oil-containing compositions. The amorphous sulphur may, therefore, desirably be employed as a dust, or in suspensions, or emulsions, or solutions, particularly in the presence of oils, in the production of insecticides and fungicides. As exemplary of an amorphous sulphur, the following is given. Flowers of sulphur are treated with carbon bisulphide to remove the carbon disulphide soluble form of sulphur. The amorphous sulphur remains in the form of empty spheroid shells.

A form of amorphous sulphur known as "soluble amorphous" sulphur is particularly desirable for utilization in compositions in accordance with the present invention. This so-called "soluble amorphous" sulphur may be produced in the following way. Flowers of sulphur, known to contain some amorphous material, is treated with carbon disulphide to remove the soluble crystalline form of sulphur present, and an amorphous sulphur is thus left. This amorphous sulphur may then be treated with ammonium hydroxide to produce a finely divided sulphur known as "soluble amorphous" sulphur. It is possible that some of this so-called "soluble amorphous" sulphur may be in crystalline condition, but the nature of the material very markedly distinguishes it from the ordinary crystalline types of products available on the market. This so-called "soluble amorphous" sulphur is particularly desirably utilized in the production of insecticides and fungicides, either in the form of dust, or in suspensions or emulsions, because it has been found to exhibit a greater toxicity than the ordinary sulphur materials employed in the art in the production of such compositions. Consequently the amorphous sulphurs, and particularly the "soluble amorphous" sulphur may be employed, not only in the types of compositions set forth hereinabove, but may be utilized in lieu of the prior art types of sulphurs employed in the insecticidal and fungicidal compositions on the market. The higher degree of toxicity exhibited by the "soluble amorphous" sulphur is due in part at least to its content of a fraction of a percent of ammonium sulphide.

The stepping-up action which ammonium sulphide exhibits in this way, may be utilized in connection with other sulphur containing fungicides and insecticidal compositions. Thus to any sulphur containing fungicidal or insecticidal composition, a fraction of a percent may be added. The amount of ammonium sulphide employed in this way should be very limited, and the utilization of a very small amount of ammonium sulphide in this way should be sharply differentiated from the use of very substantial quantities of ammonium sulphide in such compositions. Ammonium sulphide exhibits, when used in large quantities, substantial toxicity against the plant structures themselves, so that the amount of ammonium sulphide utilized in accordance with this feature of the invention should be limited to an amount that does not exhibit undesired action on the plant itself. A fraction of a percent is sufficient for this purpose, for example .9%. In lieu of ammonium sulphide, the sulphides of the alkali metals and alkaline earth metals may be utilized, or the polysulphides of any of these metals and alkaline earth metals may be employed.

Some examples illustrating several forms of the present invention are referred to immediately below.

A composition may be made up utilizing carbon disulphide, Turkey red oil, and "Pyrocide", together with sulphur. One desirable composition will have these ingredients in the proportions of 20 cc. of carbon disulphide to 20 cc. of Turkey red oil, to 15 cc. of "Pyrocide", and 3 grams of sulphur. The "Pyrocide" is a pyrethrum extract in kerosene containing 2.15% of pyrethrins. The components may be admixed in any desired way. The sulphur may be omitted from the composition, if desired. In lieu of the "Pyrocide" there may be employed the same amount of "Lethane" or "Halowax" or "Blackleaf 50", or decahydronaphthalene, etc.

Another example of a composition employed in accordance with the present invention having different proportions of ingredients from those set forth above includes carbon disulphide, Turkey red oil and "Pyrocide" in the proportions of 30 cc. of carbon disulphide to 50 cc. of Turkey red oil and 30 cc. of the "Pyrocide". This composition may be utilized as a basis for inclusion of various components, for example, there may be added to the composition 3 grams of crude sulphur, or 4 cc. of a saturated aqueous solution of copper sulphate, or 1 gram of copper resinate, or .5 gram of s-diphenylthiourea, or 1 gr. of paradichlorobenzene or 1 gr. of naphthalene.

Another example includes carbon disulphide 109.1 cc., Turkey red oil 109.1 cc., and pyrethrum concentrate 1.8 grams, the latter containing approximately 30% of pyrethrins. To this composition, there may, if desired, be added 8 grams of sulphur, or any of the additions referred to under Examples 1 and 2 above may be employed.

Another type of composition is illustrated by the employment of carbon disulphide and Turkey red oil in the ratio of 50 cc. of the former to 25 cc. of the latter. This composition may be utilized as such, or may desirably be employed, as is also true of the other specific examples given herein, for addition to known insecticides or fungicides to obtain the stepping up action. The composition of this example may have added to it 3 grams of sulphur or any of the other additions referred to above in Examples 1 and 2.

Finally we may note a composition containing carbon disulphide, "Emulphor" and "Pyrocide" in alcohol, in the ratio of 10 cc. of carbon disulphide to 10 cc. of "Emulphor" and 7.5 cc. of "Pyrocide" in alcohol. This composition may be utilized as such, or may have added to it any of the components set forth in Example 2 above, for example, .5 gram of sulphur may be added thereto.

These examples illustrate the fact that the proportions and components of the compositions may vary within considerable limits.

As illustrative of some of the noteworthy effects obtainable with insecticidal and fungicidal compositions produced in accordance with the present invention, the following may be given. A composition containing Turkey red oil, kerosene and pyrethrum of the usual character and concentration employed for such purposes in the prior art gave a 24% kill with aphids, and a 67% kill with thrips. A composition including Turkey red oil, kerosene and pyrethrum, together with carbon disulphide and sulphur made up in accordance with the present invention and containing the Turkey red oil, kerosene and pyrethrum in the same proportions as that given immediately above, showed, however, with the inclusion of the carbon disulphide and sulphur in accordance with the present invention a 66% kill with aphids and a 92% kill with thrips. Such results are, of course, entirely unexpected. This example illustrates not only the effectiveness of such insecticidal and fungicidal compositions when produced in accordance with the present invention, but also serve to illustrate the stepping up action which is obtainable in accordance with the present invention by the inclusion of these materials with prior art types of compositions.

The unexpected increase in kill obtainable by the inclusion of sulphur may be illustrated by the following examples. In a pyrethrum composition containing carbon disulphide and Turkey red oil, but no sulphur, a 35% kill of red spider was obtained, whereas the same composition in the same proportions, but including sulphur in accordance with the present invention, resulted in a 95% kill of red spider. Similarly a thiocyanate mixture containing carbon disulphide and Turkey red oil, but containing no sulphur, which gave an 81% kill of aphids, a 19% kill with red spider, and a 53% kill with Angoumois grain moth eggs, upon the inclusion of sulphur in accordance with the present invention resulted in a 100% kill of aphids, an 88% kill of red spider and a 96% kill of the Angoumois grain moth eggs.

These results, as noted, illustrate not alone the effectiveness of compositions produced in accordance with the present invention, but the remarkable so called stepping-up action which is obtainable by the inclusion of the components of the present invention with prior art types of insecticides.

Having thus set forth my invention, I claim:
1. An insecticide or fungicide containing amorphous sulphur.
2. An insecticide or fungicide in dust, suspension, emulsion or solution form containing "soluble amorphous" sulphur.

3. A fungicidal or insecticidal composition containing sulphur and a fraction of a per cent of a compound selected from the group consisting of the sulphides and polysulphides of the alkali metals, ammonium, and the alkaline earth metals.

4. A fungicidal or insecticidal composition containing sulphur and a small amount of ammonium sulphide insufficient to exhibit substantial plant toxicity but sufficient to substantially increase the parasiticidal action of the composition.

5. An insecticide or fungicide containing amorphous sulphur and a small amount of ammonium sulphide insufficient to exhibit substantial plant toxicity but sufficient to substantially increase the parasiticidal action of the composition.

6. A substantially non-aqueous fungicide comprising carbon disulphide, a minor amount of a miscibilizing agent, amorphous sulphur, and a fraction of a percent of ammonium sulphide, the components being present in proportions to make the composition miscible with water to produce a relatively stable emulsion or dispersion therein.

MYRON VERNON ANTHONY.